Feb. 26, 1952 A. A. RIBAUDO ET AL 2,587,220

TELEPHONE MEMORANDUM DEVICE OR HOLDER

Filed April 13, 1948

INVENTORS
ANDREW A. RIBAUDO
JAMES ORILIA,
BY
McMorrow, Berman & Davidson
ATTORNEYS.

Patented Feb. 26, 1952

2,587,220

UNITED STATES PATENT OFFICE 2,587,220

TELEPHONE MEMORANDUM DEVICE OR HOLDER

Andrew A. Ribaudo and James Orilia, Brooklyn, N. Y.

Application April 13, 1948, Serial No. 20,777

3 Claims. (Cl. 45—.5)

This invention relates to a telephone memorandum device or holder adapted to be attached to the raised central button or escutcheon upon the intermediate portion of a dial or the like associated with a telephone instrument, and particularly to a type of holder which is simple and light in construction and so formed as to be unobtrusive as possible.

The main object of our invention is to provide a memorandum holder or device of the character indicated which is particularly well designed for low cost and convenient manufacture, and which embodies a particularly useful construction serving the convenience of the telephone user.

Another object is to provide such a telephone device which is an efficient dispenser of memorandum slips upon which notes may be made while telephoning.

A further object is to have such a telephone memorandum device or holder which merely consists of four main parts readily assembled during manufacture and therefore very reasonable in cost, although we may use fewer or more parts.

It is also an object to have such a telephone memorandum device which is quickly applied to a telephone or removed therefrom upon occasion, but which is instantly ready for use when applied.

It is likewise an object to have such a memorandum device which contains a follower plate maintained in substantial parallelism with the back plate thereof by an interior spring capable of exerting equable pressure throughout said plate in order to avoid clamping any single portion of the memorandum slips or pad which may be inserted into the device; therefore, instead, allowing easy removal of the paper of the pad or stack, one slip or sheet at a time.

It is even an ancillary object to provide a memorandum device of this character which has, despite the fact that it normally covers the local call number of the telephone instrument to which it is applied, nonetheless a special window of its own displaying the same number.

Other objects and advantages of our invention will appear more fully in detail as the specification proceeds.

In order to facilitate ready comprehension of our invention, the latter is illustrated on the accompanying drawing forming part hereof, and in which.

Throughout the views, the same reference numerals indicate the same or like parts.

It is a common experience when using a telephone that certain statistics or matters come up or perhaps are communicated from the other end of the line to the user of the phone which may require to be recorded at once to avoid forgetting the same. All too often paper is missing and certainly not conveniently located near the telephone so that at least a delay occurs in order to obtain the necessary material for recording the notations desired, and this consumes time on the telephone, which might otherwise be profitably used for conversation or obtaining further information. It is, of course, known that certain makeshifts have been attempted to supply such lack, but nothing has been universally adopted thus far.

After duly considering this problem, we have found it quite feasible to apply a special memorandum device to the central portion of the dial usually associated with telephone instruments, which covers the space ordinarily indicating the number of the telephone having the mentioned dial, as will now be more particularly described.

Figures 1, 2, 3, 4, 5:
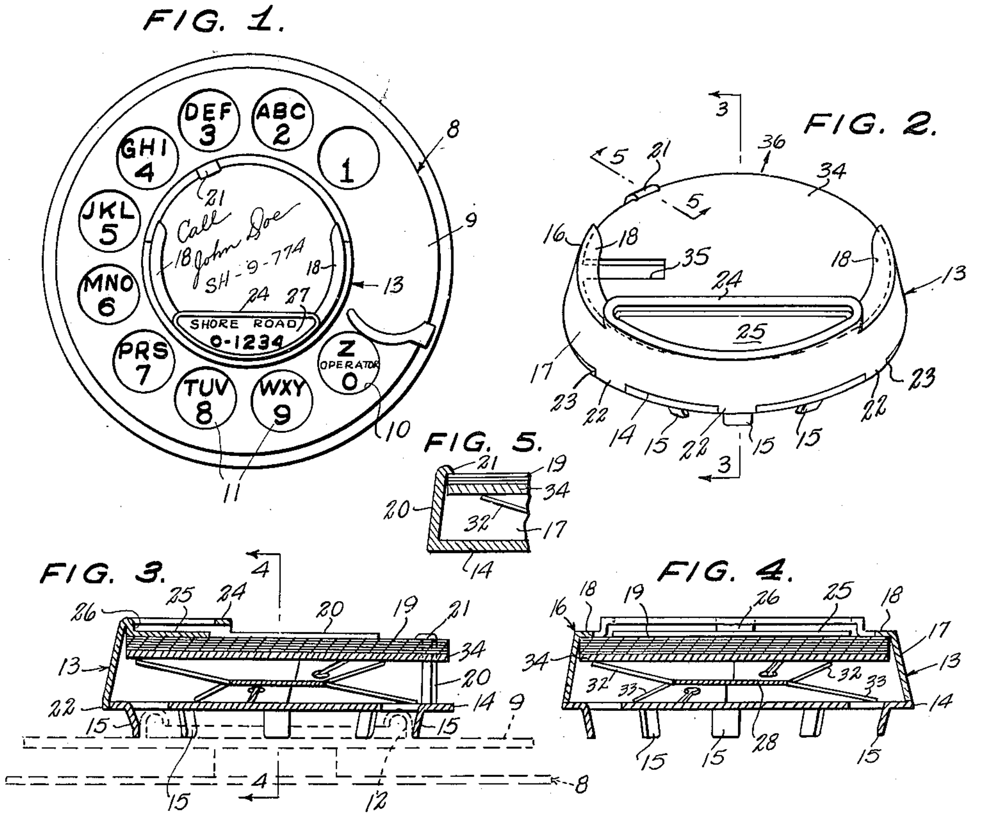
Figure 1 is a plan view of a dial such as usually associated with a telephone instrument when equipped with a memorandum device or holder made according to the invention and embodying the same in a practical form.
Figure 2 is a perspective view of the telephone memorandum device or holder on an enlarged scale.
Figure 3 is a section of the device of Figure 2 taken on line 3—3.
Figure 4 is another section of the same device taken on line 4—4 in Figure 3.
Figure 5 is a fragmentary section taken on line 5—5 in Figure 2.
Figure 8:
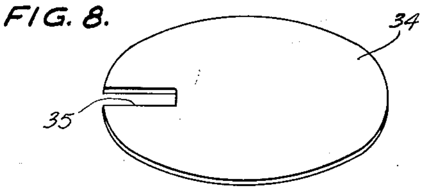
Figure 8 is a perspective view of the follower disc of the present device.
Figure 6:
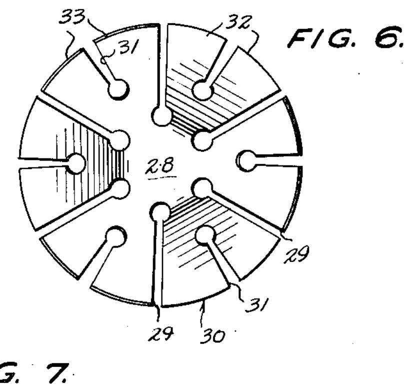
Figure 6 is a plan view of the radially-slotted sheet metal spring from within the memorandum device as partly shown also in Figures 3 and 4.
Figure 7:
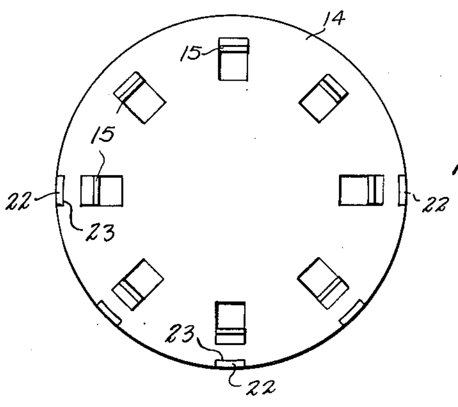
Figure 7 is a bottom plan view of the memorandum device of Figure 2.

Hence, in the practice of our invention, and referring again to the accompanying drawing, a dial, generally indicated at 8, such as usually associated with a telephone instrument has the usual rotating disc 9, with finger holes 10, 10 exposing to view the numbers 11, etc., and upon the center number escutcheon a bounding wall 12, indicated in broken lines in Figure 3. This bounding wall 12 has an inwardly-turned flange for retaining a number plate in well known manner and need not be further referred to, except in so far as it forms an anchorage for the invention. Thus, a telephone memorandum device, generally indicated at 13, primarily includes a backing plate 14 having a plurality of gripping fingers or lugs 15 struck through the same and normally engaging about the mentioned bounding wall 12 of the escutcheon plate upon the telephone dial. Upon this backing plate is frictionally mounted a memorandum retainer 16 of substantially U shape, and having a sloping or upwardly-converging bounding wall 17 terminating at the top of the two sides thereof in a pair of retaining flanges 18, 18 forming front stops for the stack or pad of memorandum sheets 19, while rearwardly a post 20 projects upwardly from the backing member and terminates at the top in an inwardly-turned hook 21 serving to cooperate with the inwardly-turned flanges 18, 18 in retaining the memorandum pad or sheets properly centered upon the device. At the bottom of the inclined wall 17 on member 16, there is a spaced group of depending lugs 22, 22 interfitting notches 23, 23 upon the periphery of backing plate 14, the arrangement being such that during manufacture, the two members 16 and 14 are forced together so that these lugs and notches interfit and frictionallly hold the two parts assembled after once being forced together. It is to be noted that while the hook 21 on post 20 cooperates with the mentioned flanges 18 of the bounding or retaining wall 17, this post is not secured to the latter or to the retaining member 16, but directly to the backing 14, while the flanges 18 merely form the upper portions at the sides of wall 17. On the other hand, at the front edge of the wall 17 is formed an integral frame 24 through which is struck down a supporting plate 25 and connected to the wall 17 by a neck portion 26 and serving to expose a card 27 displaying the local phone number when this card rests upon plate 25 within frame 24.

Confined within the outline of bounding wall 17 is a disc-shaped sheet metal spring 28 having a group of radial slots 29, 29 cut in from the periphery 30 thereof, while a group of relatively shorter radial slots 31, 31 are spaced between slots 29 with alternate pairs of radially-directed spring leaves 32 raised, while the other intermediate spring leaves 33 of similar outline are bent downward, or in the opposite direction from spring leaves 32. The arrangement is such that the central or intermediate area of spring 28 is spaced above the backing plate 14 with spring leaves or fingers 33 resting upon the backing and the spring fingers or leaves 32 being raised at their outer ends a distance from said backing and supporting a follower plate 34 serving to support the pad or stack of memorandum sheets 19 already referred to. Due to the form of the spring, the latter is effective to exert equable pressure at substantially all points upon the follower plate, so that it is resiliently propelled forward or upward toward retaining flanges 18 and frame 24, and, therefore, exerts no undue pressure at any one point. The mentioned follower is simply a flat disc of metal or the like in which a radial slot 35 extends inwardly from the periphery a limited distance for the purpose of straddling the post 20 rising up from the backing plate 14 during assembly of the device. If this follower plate is first placed so that its slot 35 first straddles the mentioned post 20, it is a simple matter to swing the follower plate into position beneath the two flanges 18 and fully into central position within the U-shaped retaining wall 17, after which the plate is turned sufficiently so that slot 35 no longer registers with the post, but instead comes under one of the retaining flanges 18. It is self-evident that if some other arrangement of slots and spring fingers is desired for the spring 30, this may also be adopted. However, the form shown and described is preferred, as it is found to produce the desired even pressure resiliently holding the follower plate up in such position as to hold the pad or stack of memorandum sheets 19 against both flanges 18, card-supporting and displaying plate 25, and retaining hook 21, with substantially equal pressure, while this form of spring is also very readily manufactured. It should be noted that plate 25, hook 21 and flanges 18 are designed to occupy substantially the same level, and as post 20 and its retaining hook 21 are spaced but a short distance from the left flange 18, and a much greater distance from the right-hand flange 18, the memorandum sheets are readilly slipped off stack 19 one sheet at a time in the direction of arrow 36 in Figure 2 by a simple movement of the thumb.

In making the device, the backing plate 14 is simply stamped from a single disc with the gripping fingers 15 merely struck down through the plate and the peripheral notches 23 simultaneously cut with the formation of fingers 15. Then, again, when the memorandum-retainer 16 is made, this also is stamped from a single piece of sheet metal and, as already mentioned, is provided with the downwardly-projecting short lugs 22 which interfit with the peripheral notches 23 so that when the two parts are forced together, they will thereafter remain assembled and require no other means for holding them together. Subsequently, the spring 30 is placed in position and the backing plate placed with slot 35 straddling the backing post 20 and this plate turned in upon the spring until it meets inside of bounding wall 17 when the backing plate may be turned so that the slot no longer registers with the post, but instead directed in some other forward direction so as to present an unbroken edge rearwardly upon the device, as particularly shown in Figure 2. When this device is to be placed in position, this is readily performed by merely pressing it in place upon the bounding wall 12 of the escutcheon or projecting central area upon a dial associated with a telephone instrument, or some other plate similarly associated with the latter which may have such a central escutcheon plate or structure. Thereafter, a pad or stack of sheets 19 is inserted by first pressing the follower plate 34 down sufficiently to allow insertion of these memorandum sheets beneath the two side flanges 18 and front plate 25 beneath frame 24 when the installation of the device and its filling with a supply of memorandum sheets is complete. In addition, a card 27 is inserted in the frame 24 upon plate 25 bearing the local telephone number, while upon the card may be inserted a protecting cover of celluloid or the like, and the device is ready for use.

Although we have described four main parts as composing the present device, it may be expedient for manufacture on a large scale to use one or more additional parts or the parts may be simplified and reduced to less than four. While this invention is useful for application to dial instruments, it is, of course, equally applicable to instruments having no dial, but merely the fixed disc structure with the center escutcheon displaying the number of the instrument.

From the foregoing, it is obvious that the present invention merely involves four members which, when once assembled in a very simple manner, readily serves to provide conveniently-accessible memorandum slips or sheets at the telephone, not to mention that obviously from the very form and arrangement of the parts, this device is very simple to manufacture and assemble.

Manifestly, variations may be resorted to and parts and features may be modified or used without others within the scope of the appended claims.

Having now fully described our invention, we claim:

1. In a memorandum device for attachment to the rotatable dial disc of a dial telephone, said dial disc being provided with a concentric aperture, a support positioned in aligned relation with respect to said aperture and detachably connected to said disc, said support comprising a backing plate, gripping means carried by said backing plate and frictionally engaging the bounding wall of said aperture for positioning said support with respect to said dial disc, an arcuate wall extending partially around said backing plate and having one end fixedly secured thereto to thereby form a channelway for the reception of a memorandum pad, retaining means extending inwardly from the other end of said arcuate wall and secured thereto, a follower plate for supporting said memorandum pad mounted within said channelway for movement toward and away from said retaining means, means carried by said backing plate intermediate the ends of said arcuate wall and operatively engaging said follower plate for guiding the latter in its path of sliding movement, and resilient means arranged intermediate said follower and backing plates resiliently urging said follower plate toward said retaining means, and a memorandum pad of circular shape disposed in said channel-way between said follower plate and said retaining means and held by said resilient means against said retaining means, the ends of said arcuate wall being spaced apart a distance sufficient for the passage of sheets of said memorandum pad therebetween.

2. In a memorandum device for attachment to the rotatable disc of a dial telephone, said dial disc being provided with a concentric aperture, a support positioned in aligned relation with respect to said aperture and detachably connected to said disc, said support comprising a backing plate of circular shape, gripping means carried by said backing plate and frictionally engaging the bounding wall of said aperture for positioning said support with respect to said dial disc, said gripping means comprising a plurality of spaced gripping fingers dependingly supported from said backing plate, an arcuate wall extending partially around said backing plate and having one end fixedly secured thereto to thereby form a channelway for the reception of a memorandum pad, retaining means extending inwardly from the other end of said wall and secured thereto, a follower plate of circular shape disposed within said channel for movement toward and away from said retaining means, means carried by said backing plate intermediate the ends of said arcuate wall and operatively engaging said follower plate for guiding the latter in its movement toward or away from said retaining means, resilient means disposed between said follower and backing plates resiliently urging said follower plate toward said retaining means to thereby hold said memorandum pad intermediate said follower plate and said retaining means, and a memorandum pad of circular shape disposed in said channel-way between said follower plate and said retaining means and held by said resilient means against said retaining means, the ends of said arcuate wall being spaced apart a distance sufficient for the passage of sheets of said memorandum pad therebetween.

3. In a memorandum device for attachment to the rotatable disc of a dial telephone, said dial disc being provided with a concentric aperture, a support positioned in aligned relation with respect to said aperture and detachably connected to said disc, said support comprising a backing plate of circular shape, gripping means carried by said backing plate and frictionally engaging the bounding wall of said aperture for positioning said support with respect to said dial disc, an arcuate wall extending partially around said backing plate and having one end fixedly secured thereto to thereby form a channelway for the reception of a memorandum pad, retaining means extending inwardly from the other end of said wall and secured thereto, a follower plate of circular shape disposed within said channelway for movement toward and away from said retaining means, means carried by said backing plate intermediate the ends of said arcuate wall and operatively engaging said follower plate for guiding the latter in its movement toward and away from said retaining means, said last-named means comprising a vertically-disposed post having its lower end fixedly secured to said backing plate at the peripheral edge of the latter and having its upper end turned inwardly, resilient means arranged intermediate said follower and backing plate resiliently urging said follower plate toward said retaining means, said last-named means comprising a disc-shaped spring provided with a plurality of radially slotted portions with alternate raised and depressed radial spring sections, said raised sections operatively engaging said follower plate and said depressed sections operatively engaging said backing plate, and a memorandum pad of circular shape disposed in said channel-way between said follower plate and said retaining means and held by said resilient means against said retaining means, the ends of said arcuate wall being spaced apart a distance sufficient for the passage of sheets of said memorandum pad therebetween.

ANDREW A. RIBAUDO.
JAMES ORILIA.

REFERENCES CITED

The following references are of record in the file of this patent:

UNITED STATES PATENTS

| Number | Name | Date |
|---|---|---|
| 1,425,841 | Davison | Aug. 15, 1922 |
| 1,491,331 | Baker | Apr. 22, 1924 |
| 1,575,353 | Magrath | Mar. 2, 1926 |
| 1,812,964 | Labaugh et al. | July 7, 1931 |
| 1,949,447 | Beck | Mar. 6, 1934 |
| 2,108,526 | Clifford | Feb. 15, 1938 |
| 2,129,876 | Rumbold | Sept. 13, 1938 |
| 2,268,248 | Goff | Dec. 30, 1941 |
| 2,342,348 | Johnson | Feb. 22, 1944 |
| 2,512,457 | Disken | June 20, 1950 |
| 2,516,592 | Richter et al. | July 25, 1950 |